United States Patent [19]

Goldman et al.

[11] 3,998,242

[45] Dec. 21, 1976

[54] PLASTIC GANG VALVE ASSEMBLY

[75] Inventors: Marvin A. Goldman, Great Neck; Jerome N. Goldman, New York, both of N.Y.

[73] Assignee: Penn-Plax Plastics, Inc., Garden City, N.Y.

[22] Filed: Apr. 7, 1975

[21] Appl. No.: 565,337

[52] U.S. Cl. .................... 137/608; 119/5
[51] Int. Cl.² ..................... A01K 64/02
[58] Field of Search ........... 119/5; 137/271, 343, 137/597, 606, 608, 798; 251/310, 311, 312; 285/156, 189, 190

[56] References Cited

UNITED STATES PATENTS

| 190,295 | 5/1877 | Dummer | 251/310 X |
|---|---|---|---|
| 3,092,141 | 6/1963 | Stark | 251/367 X |
| 3,154,102 | 10/1964 | Harris | 251/367 X |
| 3,331,392 | 7/1967 | Davidson et al. | 137/606 X |
| 3,402,253 | 9/1968 | McCracken | 285/190 X |
| 3,433,261 | 3/1969 | Fox | 137/608 |
| 3,459,221 | 8/1969 | Axelrod | 137/608 |
| 3,477,469 | 11/1969 | Paley | 137/608 |
| 3,516,638 | 6/1970 | Piggott | 251/310 X |
| 3,643,694 | 2/1972 | Duke et al. | 137/608 |
| 3,895,605 | 7/1975 | Goldman | 119/5 |

*Primary Examiner*—Alan Cohan
*Assistant Examiner*—Gerald A. Michalsky
*Attorney, Agent, or Firm*—Mandeville and Schweitzer

[57] ABSTRACT

A gang valve assembly, constructed entirely of a thermosettable or thermoplastic resin material, for use in aquariums, is disclosed herein. The valve assembly may be comprised of any number of valves and may be assembled from injection molded modular elements derived from only a few basic molds. A hanger bracket for mounting the valve assembly from an aquarium wall is included.

6 Claims, 4 Drawing Figures

PLASTIC GANG VALVE ASSEMBLY

BACKGROUND AND SUMMARY OF THE INVENTION

In the past, gang valve assemblies for aquariums have been comprised of various metals which are resistant to oxidation in an aqueous environment. Typically, these valve assemblies have been comprised of many complicated and expensive machined brass fittings.

The present invention relates to an all-plastic gang valve assembly for use in a home and/or hobby aquarium, as a replacement or substitute for more conventional metal valves. This type of gang valve assembly is ordinarily supported on the aquarium wall and interconnected with an air pump for supplying oxygenated air to a plurality of air operated devices within the aquarium tank.

In accordance with the present invention, the new multiple valve assembly is constructed entirely of a thermosettable or thermoplastic resin material, and preferably a thermoplastic resin, such as high impact polystyrene, for example. The individual components are of improved and simplified design and may be injection molded on a mass production basis, using a limited number of molds therefor. Advantageously, the valve assembly may be comprised of a gang of any number of individual modular valves associated with a common manifold, also of modular design. Thus, the modularity of the individual valve bodies integrated with the modular manifold portions thereof may be assembled to form gang valves of varying numbers of individual valves.

DESCRIPTION OF THE INVENTION

With the valve design of the present invention, gang valve assemblies for aquarium use may be readily and economically comprised entirely of a thermosettable or thermoplastic resin material such as, for example, polystyrene. As such, the parts may be injection molded using a minimum number of molds, with the valve elements being completely finished when they are removed from the molds. Moreover, as is well known, the use of such resins allows for the incorporation of many different colors in the valve elements, to enhance the aesthetic appearance of the aquarium.

Other objects and advantages of this invention will be apparent from the following description, the accompanying drawings and the appended claims.

DESCRIPTION OF A PREFERRED EMBODIMENT

Figure 1:
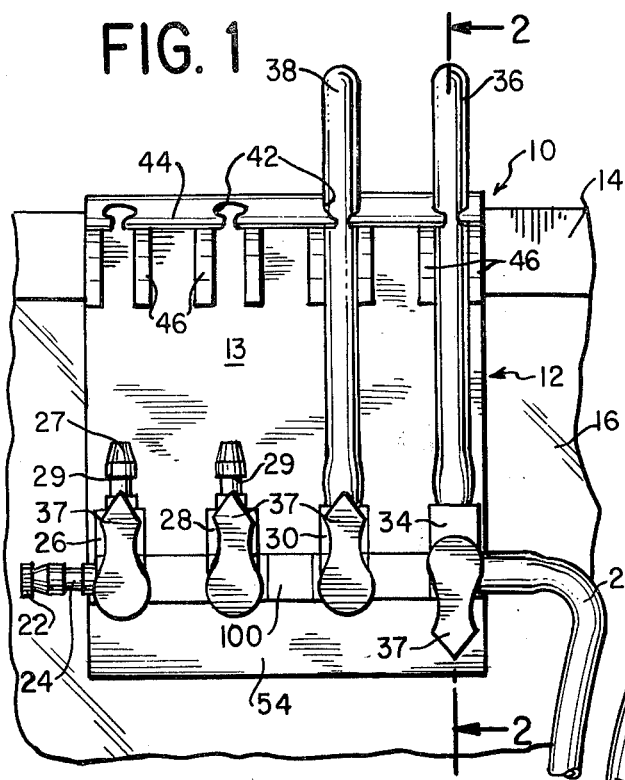
FIG. 1 is a front elevational view of the gang valve assembly arrangement of this invention, supported on a support hanger extending over the top edge of the aquarium wall.

Referring to the drawings, in which like reference characters refer to like parts throughout several views thereof, the gang valve assembly 10 of the invention is supported on a hanger 12, depending from the top edge 14 of an aquarium wall 16. As shown in FIG. 1, the gang valve assembly 10 is comprised of plural valve bodies 26, 28, 30 and 34. It will be understood, however, that valve assembly 10 may be comprised of a lesser or greater number of valve bodies, as desired.

Each of the individual valve bodies has a vertical, upwardly opening outlet nozzle member 27. As will be apparent, individual air lines, such as 38 and 36, which may be comprised of a flexible thermoplastic resin, such as polystyrene, may be telescoped over these nozzles and retained thereon by recessed annular gripping portions 29 formed thereon. Each of the individual valve bodies have a lever 37, shown in FIG. 1, which handles are integral with the valve proper for adjusting the individual valves to an on or off position, as required. In the position shown in FIG. 1, valve bodies 26, 28, and 30 are in their "off" position and valve body 34 is in its "on" position. Because of this, air entering valve assembly 10 through line 20 which is connected to a conventional air pump, not shown, allows passage of air from line 20 to line 36, and then to an appropriate position in the aquarium tank.

Figure 4:
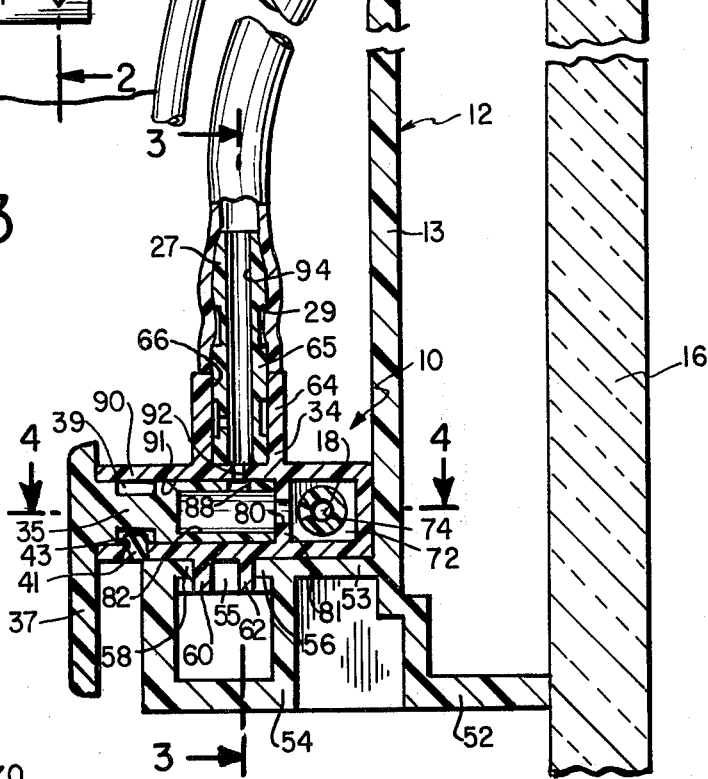
FIG. 4 is a cross sectional view taken along lines 4—4 of FIG. 2.
Figure 4:
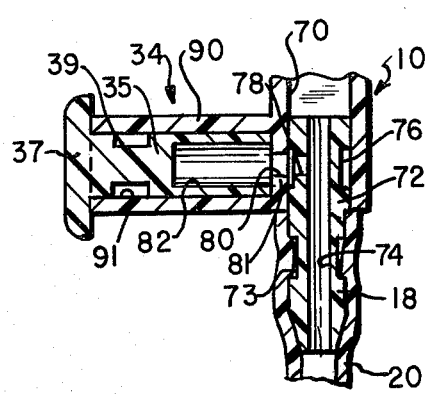

As shown in FIGS. 1 and 4, assembly 10 has an inlet nozzle 18 for frictionally engaging line 20 from an air pump. At the left hand end of assembly 10 is another nozzle 24, which may also serve as the inlet nozzle, if the particular arrangement of the aquarium requires connection to an air pump from the left hand side. Since inlet nozzle 24 is not being used in the illustration shown, it may be capped as shown at 22.

Figure 2:
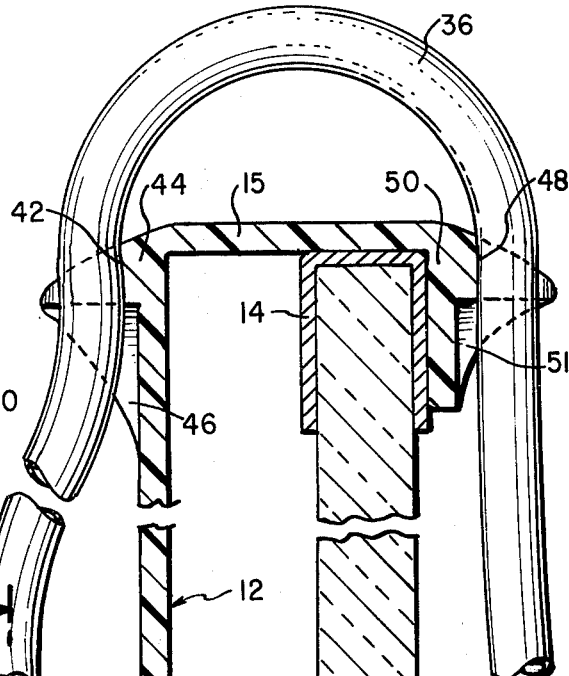
FIG. 2 is an enlarged cross sectional view taken along lines 2—2 of FIG. 1.
Figure 3:
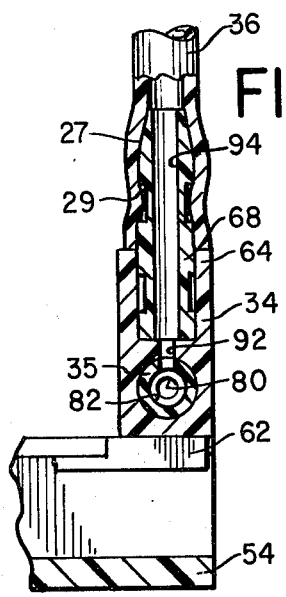
FIG. 3 is a cross sectional view taken along lines 3—3 of FIG. 2.

As shown in FIGS. 1 and 2, assembly 10 is supported on hanger 12, comprised of a front wall 13, a top wall 15 and a bottom wall 52 in a somewhat U-shaped configuration. Extending as a continuation of top wall 15, is a forwardly extending lip 44, having a plurality of semicircular openings therein for pressfitting engagement with air lines, such as 36 and 38 shown in FIG. 1. In addition, extending rearwardly from top wall 15 is a further lip 50, having a plurality of openings 48, directly opposite the openings 42, for frictionally receiving the air lines such as 36, shown in FIG. 2, extending into the aquarium tank. Openings 42 and 48 cooperate to maintain the various air lines in neatly arranged fashion, and also provide an anti-siphon gravity control for each of the flexible air lines from the aquarium tank. As shown in FIG. 2, further, each of the lips 44 and 50 have a plurality of spaced supporting webs 46, 51, respectively, for maintaining the overhanging lips 44, 50 relatively rigid. Bottom wall 52 acts as an abutment for maintaining hanger 12 in vertical alignment against aquarium wall 16.

Extending forwardly from front wall 13 of the hanger 12 is an integral horizontal flange 53, which in turn has connected to the forward end thereof, an integral generally U-shaped bracket 54. At the top of bracket 54 are a pair of opposed flanges 56, 58 which define an opening 55 for receiving in sliding engagement a pair of opposed downwardly extending integral L-shaped flanges 60, 62 of gang valve assembly 10 for support on hanger 12 adjacent the front wall 13 thereof.

As can be seen in FIGS. 2 and 4, the cross section of valve assembly 10 is generally square, although it is within the purview of this invention that it may be of different geometric configurations, such as circular or rectangular. As shown in FIG. 4, valve assembly 10 has a longitudinal bore 70. Received in one end thereof in press-fitting frictional engagement with bore 70 is inlet nozzle 18, the innermost part 72 of which is configured to fit the shape of bore 70 and, in the embodiment shown, is square in cross section. The outermost portion of nozzle 18 has a series of annular indentations, such as 73 shown in FIG. 4, for maintaining frictional engagement with connected flexible air lines such as 20. Inlet nozzle 18 includes a centrally disposed bore 74 providing flow communication between inlet line 20 and bore 70 of valve assembly 10.

As will be apparent from FIGS. 2 and 4, assembly 10 has a plurality of integral forwardly extending, cylindrical extensions 90 defining each of the valve body positions in gang valve assembly 10. Each of the integral extensions 90 has a longitudinal bore 91 for frictionally receiving a valve, such as 35 for valve body 34, as shown in FIGS. 2 and 4. Centrally disposed in the front wall 81 of assembly 10, at the position of each cylindrical integral extension 90 is an orifice 80, providing air communication between bores 70 and 91. In addition, because of the position of valve body 34 immediately adjacent the entrance nozzle 18, as opposed to valve body 30, for example, nozzle 18 has an annular cutout portion 76 with an orifice 78 communicating with bore 74 of nozzle 18, in order to provide air communication between bore 74 and bore 91 of extension 90.

As can be seen in FIGS. 2 and 4, valve 35 includes an innermost portion having a central bore 82 extending part way into valve 35. Extending from bore 82 through the valve 35 is an orifice 88, which in one position of valve 35 communicates with orifice 92, establishing air communication between bore 70 of the multiple valve assembly 10 and bore 94 of outlet nozzle 27 disposed on the top of valve 34. Integral with valve body 35 is a control lever 37 for revolving valve 35 in bore 91 of extension 90 to bring orifice 88 into and out of register with orifice 92.

Also disposed in valve 35 is annular groove 39. Thus, after insertion of valve 35 into bore 91, a locking pin 41 may be press-fit into bore 43 in the bottom of extension 90 to cooperate with groove 39 for maintaining valve 35 in position in bore 91. Integral with extension 90 is an extension 64, which is shown in FIG. 1 as being square in cross section, although it is within the purview of this invention that extension 64 may be circular in cross section, for example. Outlet nozzle 27 extends into extension 64 in frictional press-fitting engagement with bore 66 thereof, and the innermost portion 65 of nozzle 27 is shaped to fit bore 66 for appropriate frictional engagement. Nozzles 27 are the same configuration as nozzle 18 for interchangeability and conformity of manufacture and, therefore, has an orifice 67 the same as orifice 78 in nozzle 18. The description of valve body 34 and the construction thereof is the same as that for valve bodies 26, 28 and 30. Thus, as will be apparent from the above description, by appropriate manipulation of control levers 37 of each of valve bodies 27, 29, 30 and 34 communication can be made or broken between air line 20 coming from a pump for directing oxygenated air through an appropriate number of air lines, as desired, to various locations in the aquarium tank. Moreover, because of the flexible nature of the resin material utilized herein, the various interrelated parts engage each other in frictional engagement, negating the need for separate sealing gaskets and fine machining, in order to make the parts move together in appropriate fashion and/or prevent leakage. Again, because of the nature of the materials used here, the individual valves may be inserted in their respective bores and locked in place by a simple press-fit locking pin, eliminating the need for expensive separately designed screw and/or bolt connecting elements. Because of the integral nature of the gang valve assembly herein, appropriate abutments and/or brackets can be included during the formation thereof for sliding engagement with a separate hanger, and for maintaining the various air lines in untangled assembly for use.

Nevertheless, the individual parts of the multiple valve assembly herein may be constructed by simple injection molding procedures utilizing only three or four relatively inexpensive conventional injection molds, which may be arranged to formulate gang valve assemblies having the desired number of valve bodies. Also, the various inlet and outlet nozzles 18, 27 can all be made from a single mold for press-fitting engagement at each end of the multiple valve assembly and at the top of each individual valve body. In certain instances, it may be appropriate to include an insert, such as 100 shown in FIG. 1, for joining together in a single assembly, a number of gang valve assemblies in groups of two or three, depending upon the number of valves desired in any one assembly.

Because of this conformity and interchangeability of parts and because of the relative simplicity of construction, a gang valve assembly of any desired number of valve bodies may be realized. Also, because of the inherent flexibility of the uniform parts, they are easily joined by frictional engagement. Therefore, the arrangements of apparatus herein are particularly appropriate for mass production techniques, which provide the conformed parts in relatively inexpensive fashion, as compared to expensive complicated machined metallic assemblies provided previously.

While the forms of apparatus herein described constitutes preferred embodiments of the invention, it is to be understood that the invention is not limited to these precise forms of apparatus, and that changes may be made therein without departing from the scope of the invention, which is defined in the appended claims.

We claim:
1. A gang valve assembly comprised entirely of a resin material, said assembly comprising
   a. a plurality of identical connected-together valve bodies, each with an integral portion defining an elongated assembly having a longitudinally extending main distribution bore therethrough;
   b. a first orifice in each said valve body and spaced along said assembly, with each first orifice communicating with said main distribution bore;
   c. a plurality of integral first extensions on each said valve body, each of said first extensions defining a cylindrical valve receiving cavity surrounding one of said first orifices;
   d. a plurality of cylindrical valves with one each rotatably disposed in each of said first extension cavities;
   e. each of said valves having an axial bore communicating with its respective first orifice;
   f. each of said valves having a radial orifice communicating with its respective axial bore;
   g. each of said first extensions having a second orifice;
   h. each of said first extensions having an integral second extension around said second orifice defining an outlet for each of said valve body extensions whereby rotating of one of said valves in its respective first extension brings selectively said valve body orifice into and out of communication with its respective second orifice;

i. a plurality of elongated plugs with one each inserted into one end of said main body distribution bore and the cavities defined by said second extensions;

j. each of said plugs having a longitudinally extending bore and at least one annular groove;

k. each of said plugs having a radial bore communicating between its longitudinal bore and its respective annular groove; and l. each of said plugs having a first portion with a cross sectional configuration for frictionally engaging selectively one end of said main body distribution bore and the cavities defined by said second extensions.

2. A gang valve assembly as recited in claim 1, in which a. the axes of said first and second extensions are at right angles to each other.

3. A gang valve assembly as recited in claim 1, in which a. each of said valves has an integral lever disposed at one end thereof for rotating its respective valve in its respective first extension cavity.

4. A gang valve assembly, as recited in claim 1, in which a. each of said valves includes an annular groove and each of said first extensions includes a radially extending opening whereby insertion of a valve into the cavity of its respective first extension brings said groove into registry with its respective opening; and b. a locking pin for each of said valves inserted into said opening for bringing about engagement of said locking pin with said annular groove, locking said valve into its respective first extension cavity.

5. A gang valve assembly as recited in claim 1, which includes a. at least one pair of opposed L-shaped integral brackets for engaging cooperating abutments on a support for said assembly;

b. a generally U-shaped supporting hanger for said assembly, with the top portion thereof defining gripping surfaces for engaging the top edge of a supporting wall;

c. said supporting hanger having an integral forwardly extending supporting surface adjacent the bottom thereof; and d. said supporting surface having opposed integral flanges defining an opening for slidingly receiving the said opposed L-shaped integral brackets of said valve assembly.

6. The combination of claim 5, in which a. the said top portion of said supporting hanger includes a forwardly and a rearwardly extending integral lip; and b. in which each of said lips includes a plurality of spaced apart fluid conveying hose engaging openings for frictionally engaging a plurality of hoses connected to said gang valve assembly.

* * * * *